Figure 1:
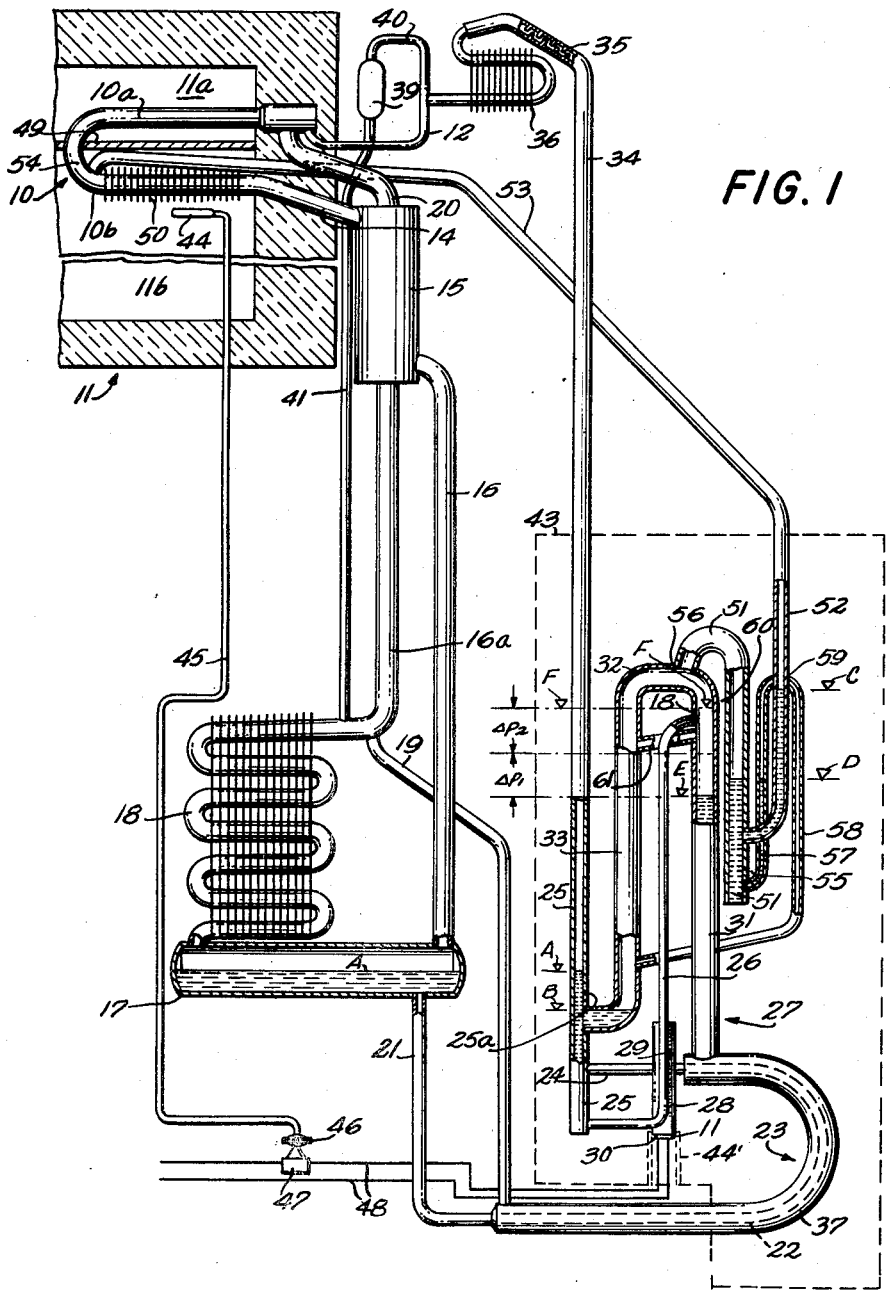

June 28, 1960 W. G. KOGEL 2,942,431
ABSORPTION REFRIGERATION
Filed Feb. 25, 1958 2 Sheets-Sheet 1

INVENTOR.
Wilhelm Berg-Kogel
BY
ATTORNEY

United States Patent Office

2,942,431
Patented June 28, 1960

2,942,431

ABSORPTION REFRIGERATION

Wilhelm Georg Kogel, Stockholm, Sweden, assignor to Aktiebolaget Electrolux, Stockholm, Sweden, a corporation of Sweden Filed Feb. 25, 1958, Ser. No. 717,416

Claims priority, application Sweden Feb. 27, 1957

13 Claims. (Cl. 62—107)

My invention relates to absorption refrigeration, and is especially concerned with distribution of liquid circulating in absorption refrigeration systems.

It is an object of the invention to provide an improvement in absorption refrigeration systems to limit the extent to which a column of liquid in a liquid circuit can rise with decrease in pressure of a body of vapor in a space above the liquid surface of the column.

Another object is to increase and decrease the height of a liquid column in a liquid circuit with variations in pressure of a body of vapor in a space above the liquid surface of the column, and maintain the liquid surface of the column always below the region at which liquid is introduced into the space to form the column.

A further object is to provide an improvement of this type in which the liquid surface of the liquid column is maintained at a first level by the pressure of a body of vapor in the space above the liquid surface and flows from the column at an overflow point at a second higher level to which the liquid surface rises upon decrease in the pressure of the body of vapor.

A still further object is to provide an improvement of this type in a generator or vapor expulsion unit of the refrigeration system in which the liquid surface of the liquid column is always maintained at a level below the region at which liquid is introduced into the space above the column through a vapor-liquid lift pump.

A still further object is to provide an improvement of this type in which liquid flowing from the column at the overflow point is recirculated through the vapor-lift pump and diverted from its normal path of flow to the absorber to render the latter inoperable.

A still further object is to provide, in a system in which hot generator vapor flows through a trap to effect defrosting of a cooling element, an improvement of this type whereby the extent to which the trap is filled with liquid controls the flow of hot generator vapor to the cooling element and also determines the pressure of the body of vapor above the liquid surface of the liquid column.

A still further object is to provide an improvement of this type in which the body of vapor in the space above the liquid surface of the liquid column is formed by the hot generator vapor between an analyzer and the inlet of the trap, the pressure of which varies with the extent to which the trap is filled with liquid to vary the height of the column between a first level and a second higher level which is always below the region at which liquid is introduced into the space above the liquid surface of the liquid column.

The above and other objects and advantages of the invention will become apparent as the following description proceeds, and the features of novelty which characterize my invention will be pointed out with particularity in the claims annexed to and forming a part of this specification.

Figure 2:
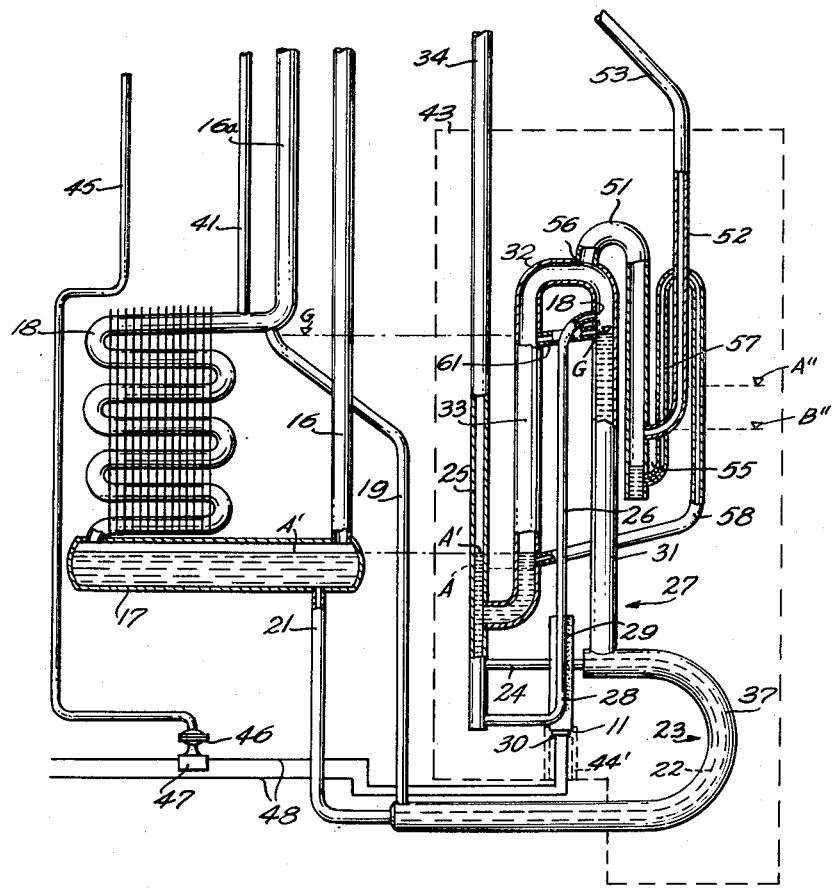

For a better understanding of my invention, reference may be had to the following description taken in connection with the accompanying drawing, in which:

Fig. 1 illustrates more or less diagrammatically an absorption refrigeration system of the inert gas type embodying the invention; and Fig. 2 is a fragmentary view of parts like those shown in Fig. 1 illustrating a different operating condition of the refrigeration system.

Referring to Fig. 1, I have shown my invention in connection with an air-cooled absorption refrigeration system of a uniform pressure type in which an auxiliary pressure equalizing gas is employed. Systems of this type are well known and include a cooling unit or evaporator structure 10 which is arranged to abstract heat from the thermally insulated interior of a refrigerator cabinet 11. Refrigerant fluid, such as ammonia, passes through a conduit 12 into the cooling unit 10 and evaporates and diffuses therein into an inert gas, such as hydrogen, to produce a refrigerating effect. The resulting gas mixture of refrigerant and inert gas flows from cooling unit 10 through a conduit 14, one passage of gas heat exchanger 15 and vertically extending conduit 16 into an air-cooled absorber comprising an absorber vessel 17 and a looped absorber coil 18.

In the absorber refrigerant vapor is absorbed by a suitable absorbent such as water, for example, which is introduced into coil 18 through a conduit 19. The hydrogen or inert gas, which is practically insoluble and weak in refrigerant, is returned to cooling unit 10 through a conduit 16a, another passage of gas heat exchanger 15 and a conduit 20.

The circulation of gas in the gas circuit just described is due to the difference in specific weight of the columns of gas rich and weak, respectively, in refrigerant vapor. Since the column of gas rich in refrigerant vapor and flowing from cooling unit 10 to the absorber coil 18 is heavier than the column of gas weak in refrigerant vapor and flowing from such coil to the cooling unit 10, a force is produced or developed within the system for causing circulation of inert gas in the manner described.

Enriched absorption liquid, which is also referred to as absorption solution, is conducted from the vessel 17 through a conduit 21, inner passage 22 of a liquid heat exchanger 23, connection 24 and standpipe 25 into a vapor lift pump 26 of a generator or vapor expulsion unit 27. The generator 27 comprises a heating tube 28 having the vapor lift pump 26 in thermal exchange relation therewith at 29, as by welding, for example. By heating the tube 28, as by an electrical heating element 30 or by a fluid fuel burner, for example, liquid from the standpipe 25 is raised by vapor-liquid lift action through pump 26 into the upper part of a second standpipe 31.

The liberated lifting vapor entering the second standpipe 31 from the pump 26 flows through a connection 32 and vertical conduit 33 to a region 25a in standpipe 25 which serves as an analyzer and is disposed below the liquid surface level A of the liquid column contained therein. Since the conduit 21, inner passage 22 of liquid heat exchanger 23 and the connection 24 provide a path of flow for absorption solution which is always filled with liquid during operation of the system, the liquid levels A in standpipe 25 and the absorber vessel 17 are essentially the same.

The generated vapor usually is a mixture of refrigerant vapor and absorption liquid vapor; and, when ammonia and water are employed as the refrigerant and absorption liquid, for example, the generated vapor is usually a mixture of refrigerant vapor and water vapor. Due to the difference in boiling points of ammonia and water, the water vapor may be removed from ammonia by cooling the mixture to condense out the water. In Fig. 1 this is accomplished by forcing all of the generated vapor from the conduit 33 through the liquid column in the analyzer 25a by bubble action.

The absorption liquid introduced into the analyzer 25a is relatively rich in refrigerant and at a lower temperature than the generated vapor; and, in bubbling through the enriched solution, the water vapor is cooled sufficiently and condenses and in this way is removed from ammonia vapor. The latent heat of condensation resulting from condensation of water vapor is given up to the enriched absorption solution and forms an internally heated zone in which some ammonia vapor is expelled out of solution. Such expelled refrigerant mixes with refrigerant vapor generated in the vapor lift pipe 26, and the mixture passes from the analyzer 25a through the upper part of standpipe 25 and a conduit or vapor line 34 to an air-cooled rectifier 35 from which refrigerant vapor flows to an air-cooled condenser 36.

Refrigerant vapor is liquefied in the condenser 36 by surrounding cooling air which flows over the surfaces thereof, and liquefied refrigerant is returned to the cooling unit 10 through the conduit 12 to complete the refrigerating cycle. The weakened absorption solution, from which refrigerant has been expelled, is conducted from standpipe 31 through the outer passage 37 of liquid heat exchanger 23 and conduit 19 into the upper part of absorber coil 18. Circulation of absorption solution in the manner just described is due to raising of liquid through the pump 26 to a higher level in standpipe 31 from which liquid can flow through the outer passage 37 of liquid heat exchanger 23 and conduit 19 by gravity to the upper end of absorber coil 18.

A pressure vessel 39 is connected by conduits 40 and 41 to the lower end of condenser 36 and to the gas circuit, as at the upper part of absorber coil 18, for example, so that any inert gas which may pass into the condenser can flow into the gas circuit. Refrigerant vapor not liquefied in condenser 36 will flow through conduit 40 to displace inert gas in vessel 39 and force such inert gas through conduit 41 into the gas circuit, thereby raising the total pressure in the system so that an adequate condensing is obtained to insure condensation of refrigerant vapor in condenser 36.

The generator or vapor expulsion unit 27 in its entirety, together with a major portion of the liquid heat exchanger 23, are embedded in a body of insulation material, diagrammatically illustrated at 43, which may be retained in a metal shell or casing (not shown) having an opening at the bottom thereof. The heating tube 28 desirably is embedded in a part of the body of insulating material 43 which is spaced from the top and bottom ends thereof. The electrical heating element 30 is arranged to be positioned within the heating tube 28 through a hollow sleeve member 44' which is formed of suitable insulating material and extends from the bottom of the heating tube 28 to the bottom opening in the shell.

Liquid refrigerant flows by gravity in the cooling unit 10, the refrigerant flowing in parallel flow with the inert gas in a low temperature section 10a and then in a higher temperature section 10b of the cooling unit. Since the inert gas flows successively through the cooling unit sections 10a and 10b, the gas in the upper cooling unit section 10a contains a lesser amount of refrigerant vapor than the gas in the lower cooling unit section 10b. The partial vapor pressure of the refrigerant is a gradient, so that the temperature of liquid refrigerant in the cooling unit is also a gradient, the evaporating temperature of liquid being lower in cooling unit section 10a than in cooling unit section 10b.

The refrigeration system just described may be controlled by a thermal bulb 44 which is affected by a temperature condition of cooling unit section 10b. As shown, the thermal bulb 44, which is arranged to be influenced by the temperature of air which is cooled by the higher temperature section 10b, is connected by a conduit 45 to a control device 46, which is operatively associated with a switch 47 connected in one of the conductors 48 for supplying electrical energy to heating element 30. In a manner well known in the art, the thermal bulb 44 and conduit 45 may form part of an expansible fluid thermostat which is charged with a suitable volatile fluid and responds to changes in a temperature condition affected by cooling unit section 10b to operate control device 46 and the switch 47 operatively associated therewith.

When the temperature condition affected by cooling unit section 10b increases due, for instance, to increase in heat load caused by the placing of warm material in the thermally insulated interior of the refrigerator, or a rise in room air temperature, the thermal bulb 44 in normal operation of the refrigeration system becomes effective to operate control device 46 and close switch 47 to complete an electrical circuit for the electrical heating element 30 so that vapor will be expelled from solution in generator 27. Conversely, when the temperature condition affected by cooling unit section 10b decreases, the thermal bulb 44 becomes effective to operate control device 46 to open the switch 47 and disconnect the heating element 30 from the source of electrical supply, so that expulsion of vapor from solution in the generator 27 will be stopped.

The refrigerating effect produced by the upper cooling unit section 10a, which is adapted to be operated at temperatures substantially below freezing, is primarily utilized to effect cooling of an upper frozen food space 11a which is defined by a partition 49 and the thermally insulated walls of the cabinet 11. Accordingly, the upper compartment 11a serves as a freezing space which is adapted to receive ice trays, frozen food packages and other matter to be frozen.

The refrigerating effect produced by the lower cooling unit section 10b, which is adapted to be operated at a higher temperature than that of cooling unit section 10a and also desirably below freezing, is primarily utilized to cool air in an unfrozen food space 11b. To increase the effective heat transfer surface of the lower cooling unit section 10b so as to promote cooling of air in the unfrozen food space 11b, a plurality of fins or heat transfer members 50 may be secured thereto in any suitable manner.

Although the refrigerator cabinet 11 is only diagrammatically illustrated, it will be understood that the frozen food space 11a is provided with a separate closure member (not shown) from that provided for the unfrozen food space 11b. While frost accumulates on both the cooling unit sections 10a and 10b, such accumulation of frost takes place much more slowly in the upper space 11a than in the lower space 11b because the need for gaining access into the former is considerably less than that for the latter. Each time the closure member (not shown) for the unfrozen food space 11b is opened to gain access thereto, some of the cool air therein is displaced by ambient air in which water vapor is present. Such air flows over the surfaces of the cooling unit section 10b due to natural circulation of air which is induced in the space 11b, the water vapor in the air condensing on the piping and fins of the cooling unit section 10b to form a layer of frost or ice thereon. If a layer of frost of considerable thickness were allowed to accumulate on the lower cooling unit section 10b, the efficiency of the refrigeration system would be reduced considerably and the system would operate for longer periods of time to maintain the unfrozen food space 11b at a desired low temperature than would otherwise be the case.

In order to effect defrosting of cooling unit section 10b, vapor expelled from generator 27 and at an elevated temperature is conducted therefrom to cooling unit 10 in a path of flow which includes conduits 51, 52 and 53. By introducing hot expelled vapor into the cooling unit 10, the partial pressure of the refrigerant vapor in the cooling unit increases and the temperature thereof rises above the freezing temperature of water. In this manner, the frost accumulated on the cooling unit 10 is melted very rapidly by the hot vapor supplied thereto from generator 27 in a path of flow which by-passes the condenser 36.

In accordance with my invention, hot vapor from the generator 27 is supplied through the conduits 51, 52 and 53 to a region of cooling unit 10 while the circulation of inert gas therethrough is substantially reduced, so that defrosting of the lower cooling unit section 10b can be effected without impairing the ability of the upper cooling unit section 10a to maintain a sufficiently low temperature to protect food and other matter stored in the frozen food space 11a during the interval of time defrosting of the lower cooling unit section is being effected. Referring to Fig. 1, it will be seen that conduit 53 is connected at its upper end to a region 54 of the cooling unit 10 at which inert gas partially enriched in refrigerant vapor and flowing from the upper cooling unit section 10a is about to enter the lower cooling unit section 10b. Hence, when hot vapor initially passes through conduit 53 into the cooling unit, such hot vapor mixes with the inert gas which is being discharged from the upper cooling unit section 10a and flows therewith into the lower cooling unit section 10b. In this way, the hot vapor supplied to the lower cooling unit section 10b is effectively utilized to increase its temperature and melt frost accumulated thereon.

As will be explained presently, the circulation of absorption solution in its circuit stops when hot vapor from generator 27 flows to the cooling unit 10 in a path of flow which by-passes the condenser 36. When absorption solution weak in refrigerant is no longer introduced into the upper end of the absorber coil 18 through the conduit 19, absorption of refrigerant vapor from the rich gas mixture passing into the absorber is substantially terminated. This reduces the difference in specific weights of the columns of rich and weak gas, whereby the force normally developed for circulation of gas in the gas circuit is reduced.

It will now be understood that when hot generator vapor is initially introduced into the cooling unit 10 and tends to flow into the lower cooling unit section 10b, the circulation of inert gas through the cooling unit slows down and is substantially reduced. Under these conditions, the refrigerating effect normally produced in the lower cooling unit section 10b is completely stopped and the hot generator vapors entering the cooling unit 10 at 53 are effectively utilized to melt frost formed on the lower cooling unit section 10b quite rapidly. As the normal circulation of inert gas through the cooling unit 10 slows down and essentially stops while defrosting of the lower cooling unit section 10b is being effected, there may be a tendency for some of the generator vapor entering the cooling unit 10 at the region 53 to pass into the upper cooling unit section 10a. However, such generator vapor eventually entering the upper cooling unit section 10a after defrosting of the lower cooling unit section 10b has been initiated and well along toward completion, is ineffective to raise the temperature of the upper cooling unit section 10a sufficiently to impair its ability to maintain a sufficiently low temperature to protect food and the like stored in the frozen food space 11a.

In order to divert hot vapor from the generator 27 to the cooling unit 10 in a path of flow which by-passes the condenser 36, I provide a U-shaped trap 55 at the region expelled vapor is diverted from its normal path of flow, such trap being constructed and connected in the refrigeration system in such a manner that liquid collects therein automatically in a controlled manner and is automatically removed therefrom to provide a completely automatic defrosting control which is operable responsive to an operating condition of the refrigeration system. As shown in Fig. 1, the U-shaped trap 55 includes the conduit 51, which is connected at 56 to the connection 32 which forms a vapor space at the upper ends of the standpipe 31 and conduit 33, and one arm 57 of an inverted U-shaped conduit having its other arm 58 connected at its lower end to the conduit 33.

The downwardly extending conduit 51, which is closed at its lower end, includes a part which is closely adjacent to the standpipe 31. The arm 57 is connected to the conduit 51 at a region immediately above the bottom closed end thereof, while the conduit 52 forming a part of the vapor by-pass line is connected to the conduit 51 at a level between the connection of arm 57 thereto and the closed end 59 of the arms 57 and 58.

The conduit 51, other than at the region 56 at which it is connected to the upper end of the standpipe 31, is spaced from the latter by a gap 60. By providing the gap 60 and arranging the standpipe 31 and conduit 51 in the insulation 43 so that the latter is less effectively insulated than the standpipe, the wall of conduit 51 will always be maintained at a somewhat lower temperature than that of the standpipe 31 during operation of the refrigeration system. Under these conditions, expelled vapor will pass from the upper part of the standpipe 31 into the conduit 51 and condense therein, such condensation taking place in accordance with what may be referred to as the "cold wall" principle. The condensate formed at the inner wall surface of conduit 51 collects in the latter and eventually seals and closes the lower end of conduit 52, so that hot vapor cannot flow through conduits 52 and 53 to the lower cooling unit section 10b.

After flow of hot vapor into conduit 52 is blocked by the liquid column in the conduit 51, liquid condensate will continue to collect in the U-shaped trap 55 until it reaches the overflow point 59 in arm 57, at which time the liquid collected in the trap will automatically flow therefrom by siphon action into arm 58 and flow into conduit 33. In this way, all of the liquid in conduit 52 and U-shaped trap 55, except the small amount in conduit 51 below the connection of arm 57 thereto, is automatically removed therefrom in a single operation by siphon action, the removed liquid flowing into the conduit 33 and flowing by gravity into the standpipe 25.

With removal of liquid from conduit 52 and U-shaped trap 55, hot expelled vapor can flow from the upper part of standpipe 31 to the lower cooling unit section 10b through conduits 51, 52 and 53 so as to melt frost accumulated on the lower cooling unit section. When hot vapor from generator 27 flows through the conduit 53, condensation also takes place at the inner wall surface thereof in accordance with the cold wall principle referred to above. The conduit 53, which is connected at its upper end to the top wall portion of cooling unit section 10b, slopes downwardly toward the region it is connected to conduit 52, so that condensate formed in conduit 53 will drain by gravity into the conduit 51 and collect therein. After an interval of time within which the lower cooling unit section 10b has been completely defrosted, the condensate collected in the trap 55 eventually blocks off the flow of hot vapor through conduit 52. Liquid will continue to collect in the trap 55 and also in the conduit 52 due to condensation of expelled vapor at the inner wall surface of the conduit 51; and, after an interval of time, the liquid collected in the trap will again be removed automatically therefrom by siphon action.

The conduit 51, which extends downwardly from the region 56 at which it is connected to the generator 27, essentially forms a pocket for collecting liquid condensate. While absorption liquid condenses in rectifier 35, such condensate returns by gravity to the generator 27 through the vapor supply line 34 and standpipe 25. Hence, the condensate collected in the conduit 51 is substantially only that liquid which forms by condensation at the inner wall surface thereof. When the conduit 52 is blocked by the liquid collected in the conduit 51, the space in the latter forms a dead-end pocket which is in communication with the path of flow of expelled vapor at only a single point 56. Under these conditions, the expelled vapor in the conduit 51 is more or less stagnant and out of the main path of flow of expelled vapor which passes through the analyzer 25a and the rectifier 35 to the condenser 36.

During normal operation of the refrigeration system, and when the liquid level in conduit 51 is at a region between the upper closed end 59 of the inverted U-shaped siphon and the point at which conduit 52 is connected to the conduit 51, as shown in Fig. 1, the liquid surface levels of the liquid columns in conduit 51 and left-hand arm 57 of the siphon are essentially at the same level designated D. This is so because the vapor pressure above these liquid columns is substantially the same due to the connection of the right-hand arm 58 of the siphon to the conduit 33 and the connection of conduit 51 at 56 to the vapor space at the upper ends of conduit 33 and standpipe 31. The vapor generated in the vapor expulsion unit 27 passes into the conduit 33 and depresses the liquid surface level therein to the level B and at this region bubbles through the part of the liquid column in standpipe 25 forming the analyzer 25a. Under these conditions, a liquid surface level is maintained at A in the standpipe 25 which, as explained above, is essentially the same as the liquid level A in the absorber vessel 17.

In Fig. 1 it will be seen that the liquid surface level of the liquid column in conduit 52 is at C and at a higher level than the liquid surface level D in conduit 51. The difference in height C—D of the liquid columns formed in conduits 51 and 52 is due to the pressure difference in the system resulting from the gas circuit being at a lower pressure than the pressure above the liquid column in standpipe 25. This pressure difference includes the pressure difference in the analyzer 25a, which is represented by the difference in height $\Delta p_1$ between the liquid surface levels A—B in standpipe 25 and conduit 31, and the pressure difference due to resistance offered to flow of fluid from the analyzer 25a through the conduit or vapor line 34, rectifier 35, condenser 36 and the connection of pressure vessel 39 to a part of the gas circuit, which is represented by the difference in height $\Delta p_2$.

When the column of liquid formed in conduit 52 is of the height shown in Fig. 1, the by-pass line for introducing hot vapor into cooling unit section 10 is blocked and generated vapor flows through the analyzer 25a to the condenser 36 from which liquid refrigerant flows by gravity to cooling unit 10. Although the liquid surface of the liquid column in standpipe 31 is at the level E, which is below the level at which weak absorption solution is introduced into the absorber coil 18 from the upper end of conduit 19, it will be understood that the vapor generated in the vapor expulsion unit 27 passes into the vapor space in the upper part of standpipe 31 and depresses the liquid level E therein sufficiently to cause weak absorption solution to pass from the upper end of conduit 19 for downward flow through the absorber coil 18.

During normal operation of the refrigeration system, the liquid surface levels D in conduit 51 and arm 57 of the siphon rise until the closed end 59 of the siphon is filled with liquid, at which time liquid in conduits 51 and 52 and arm 57 is automatically removed by siphon action, as explained above, so that vapor generated in vapor expulsion unit 27 can flow to cooling unit section 10b through the by-pass line formed by conduits 51, 52 and 53. The hot vapor introduced into cooling unit section 10b is cooled and condensed therein, the resulting heat of condensation being effectively utilized to effect rapid defrosting in the manner previously explained.

During defrosting the vapor generated in vapor expulsion unit 27 is no longer effective to depress the liquid level in conduit 33 whereby liquid columns are formed in standpipe 25 and conduit 33 having essentially the same liquid surface levels A' as in the absorber vessel 17, as seen in Fig. 2. Further, since the liquid column in the standpipe 31 is no longer being depressed by vapor under pressure in the upper part of the standpipe, the liquid column in standpipe 31 would ordinarily rise to the level F diagrammatically indicated in Fig. 1, the difference in height E—F being equivalent to the difference in height C—D and representing the pressure difference $\Delta p_1$ in the analyzer 25a plus the pressure difference $\Delta p_2$ which has been defined above and in a broad sense represents the pressure drop in certain parts of the system, such as the rectifier 35 and condenser 36, due to flow of fluid therethrough. Such rise of liquid to the level F would ordinarily take place because, as the result of hot vapor being introduced into the lower cooling unit section 10b, the temperature in the unfrozen food compartment 11b increases and the thermostatic control functions to close switch 47 and energize heating element 30 to render pump 26 operable to lift liquid therethrough to the level F in order for weak absorption solution to flow by gravity from standpipe 31 through liquid heat exchanger 23 and conduit 19 to the upper end of absorber coil 18.

If it is assumed that the liquid column in standpipe 31 could rise to the level F in Fig. 1, the upper part of such liquid column possibly could extend above the region at which the upper end of the pump pipe 26 is connected to the standpipe 31, thus interfering with the expulsion of vapor in the vapor-liquid pipe 26 and obstructing the flow of generated vapor through the by-pass line to the cooling unit section 10b.

In order that the liquid column formed in standpipe 31 cannot rise to the level F in Fig. 1 and generated vapor can flow freely from the upper end of the pump pipe 26 to the conduit 51 in the hot vapor by-pass line when defrosting is being effected, I provide a conduit 61 which is connected to the standpipe 31 through which liquid can flow from the upper part of the standpipe, thereby limiting the height of the liquid column formed therein to a level G which is below the upper end of the pump pipe 26. The liquid surface level G desirably is at a height so that gravity flow of liquid from the standpipe 31 to the upper part of absorber coil 18 through conduit 19 cannot take place. Hence, by limiting the height of the liquid column in standpipe 31 to the level G, normal circulation of absorption liquid through absorber coil 18 and absorber vessel 17 will not be effected, thereby reducing and eventually stopping circulation of inert gas in cooling unit 10 and contributing to rapid defrosting of the lower cooling unit section 10b.

The liquid overflowing from the upper part of standpipe 31 through the conduit 61 may be returned to the lower inlet end of pump 26 in any suitable manner. In the preferred embodiment illustrated, the opposite ends of conduit 61 are respectively connected to standpipe 31 and to the conduit 33. In this way, liquid overflows from the standpipe 31 to the conduit 33 and flows therefrom to standpipe 25 to the lower end of which the pump pipe 26 is connected. Hence, when defrosting is being effected and vapor is being expelled from solution in pump pipe 26, liquid raised by the pump by vapor-liquid lift action is simply being recirculated through the generator 27.

After defrosting is automatically initiated, the condensate formed in conduit 53 flows by gravity to the bottom of conduit 51 and eventually flows into the lower end of conduit 52. When the liquid column in conduit 52 rises to the level A" and the vertical distance A"—B" indicated in Fig. 2 exceeds the height A—B in analyzer 25a in Fig. 1, vapor generated in the generator 27 no longer will flow through the conduits 52 and 53 of the by-pass line and expelled vapor will again flow through analyzer 25a and conduit 34 to the condenser 36 for condensation therein.

The length of time during which defrosting takes place and the interval of time between defrosting periods can be determined to a great extent by the size of the conduits 51 and 52 and that of the U-shaped liquid trap 55 of which arm 57 forms a part; and by the relative vertical positions of the bottom of conduit 51, the region at which conduit 52 is connected to conduit 51 and the overflow point 59 of the siphon. By way of example and without limitation, the different parts may be dimensioned so that the interval of time between defrosting periods will vary anywhere from twenty hours to two days, which will represent the time it will take for liquid to collect in the conduit 52 and the U-shaped trap 55 to the overflow point 59 after sufficient liquid collects in the conduit 51 to block off flow of expelled vapor into conduit 53. Also, the parts may be dimensioned so that the period during which defrosting takes place will vary from fifteen to thirty minutes, for example, which will represent the time it will take, after liquid has been removed from conduit 52 and trap 55 by siphon action, for liquid to collect in the conduit 51 to a level therein at which flow of expelled vapor into conduit 53 is stopped.

A relatively short defrosting period of fifteen minutes in an ordinary household refrigerator, having a thermally insulated interior of seven cubic feet, is possible in accordance with the improvement just described by reason of the fact that hot vapor can be generated and supplied to the lower cooling unit 10b at an optimum rate. Also, the circulation of inert gas in the gas circuit can be substantially reduced by stopping the circulation of absorption solution in its circuit when defrosting is being effected. As pointed out above, this contributes to shortening materially the interval of time in which defrosting can be effected.

Although a particular embodiment of my invention has been shown and described, it will be apparent that modifications and changes may be made without departing from the spirit and scope of the invention.

What is claimed is:

1. In the art of refrigeration with the aid of a refrigeration system in which absorption solution is circulated in a circuit, lifting solution in such circuit in a path of flow extending upwardly to a vapor space in the system, forming from the raised solution a liquid column having a liquid surface below the region at which raised liquid is introduced into said vapor space, flowing solution in said circuit in another path of flow from a region of said liquid column below the liquid surface thereof, effecting flow of solution in said other path of flow with the aid of vapor under pressure in said vapor space above the liquid surface of said column, increasing the height of said column by reducing the pressure in said vapor space above the liquid surface thereof, and flowing liquid from the column upon increase in height thereof at an overflow point below the region at which raised liquid is introduced to said vapor space.

2. In the art of refrigeration with the aid of a refrigeration system in which absorption solution is circulated in a circuit, lifting solution in such circuit in a path of flow extending upwardly to a vapor space in the system, forming from the raised solution a liquid column, flowing solution in said circuit in another path of flow from a region of said liquid column below the liquid surface thereof, increasing and decreasing the height of said liquid column responsive respectively to decrease and increase in pressure of vapor in said vapor space above the liquid surface of said column, effecting flow of solution in said other path of flow with the aid of said vapor upon sufficient increase in pressure thereof, flowing liquid from the column at an overflow point thereof upon sufficient decrease in pressure of said vapor, and varying the height of said column with the aforesaid sufficient increase and decrease in pressure of said vapor between a first liquid surface level and a second higher liquid surface level at the overflow point which is below the region raised liquid is introduced into said vapor space.

3. In the art of refrigeration with the aid of a refrigeration system in which absorption solution is circulated in a circuit through and between an absorber and a generator, flowing absorption solution enriched in refrigerant in said circuit from the absorber to an analyzer and from the latter to the generator, expelling vapor from solution at the generator, raising upwardly to a vapor space in the system by vapor-liquid lift action, with the aid of expelled vapor, solution received by the generator from the analyzer, forming from the raised solution a liquid column, flowing solution in said circuit in a path of flow from a region of said liquid column below the liquid surface thereof, flowing expelled vapor from said vapor space to the analyzer and from the latter to a place of condensation, increasing and decreasing the height of said liquid column responsive respectively to decrease and increase in pressure of vapor in said vapor space above the liquid surface of said column, effecting flow of solution in said path of flow with the aid of said vapor upon sufficient increase in pressure thereof, flowing to the analyzer liquid from the liquid column at an overflow point thereof upon sufficient decrease in pressure of said vapor, and varying the height of said column with the aforesaid sufficient increase and decrease in pressure of said vapor between a first liquid surface level and a second higher liquid surface level at the overflow point which is below the region raised liquid is introduced into said vapor space.

4. In the art of refrigeration with the aid of a refrigeration system in which absorption solution is circulated in a circuit through and between an absorber and a generator, flowing absorption solution in the circuit from the absorber to the generator, expelling vapor from solution at the generator, raising upwardly in a first path of flow to a vapor space in the system by vapor-liquid lift action, with the aid of expelled vapor, solution received from the absorber, forming from the raised solution a liquid column, flowing solution in the circuit in a second path of flow from a region of said liquid column below the liquid surface thereof, increasing and decreasing the height of said liquid column responsive respectively to decrease and increase in pressure of a body of expelled vapor in said vapor space above the liquid surface of said column, effecting flow of solution in said second path of flow with the aid of said body of vapor upon sufficient increase in pressure thereof, flowing to the lower end of said first path of flow liquid from the liquid column at an overflow point thereof upon sufficient decrease in pressure of said body of vapor, and varying the height of said column with the aforesaid sufficient increase and decrease in pressure of said body of vapor between a first liquid surface level and a second higher liquid surface level at the overflow point which is below the region raised solution is introduced into said vapor space.

5. In the art of refrigeration with the aid of a refrigeration system in which absorption solution is circulated in a circuit through and between an absorber and a generator, flowing absorption solution in the circuit from the absorber to the generator, expelling vapor from solution at the generator, raising upwardly in a first path of flow to a vapor space in the system by vapor-liquid lift action, with the aid of expelled vapor, solution received from the absorber, forming from the raised solution a liquid column, flowing solution in the circuit in a second path of flow to said absorber from a region of said liquid column below the liquid surface thereof, increasing and decreasing the height of said liquid column responsive respectively to decrease and increase in pressure of a body of expelled vapor in said vapor space above the liquid surface of said column, effecting flow of solution in said second path of flow with the aid of said body of vapor upon sufficient increase in pressure thereof, flowing to the lower end of said first path of flow liquid from the liquid column at an overflow point thereof upon sufficient decrease in pressure of said body of vapor, and varying the height of said column with the aforesaid sufficient increase and decrease in pressure of said body of vapor between a first liquid level surface level and a second higher liquid surface level at the overflow point which is below the region raised solution is introduced into said vapor space, the pressure of the body of vapor above the column, when the liquid surface thereof is at the overflow point, being insufficient to effect flow of solution to said absorber in said second path of flow.

6. An absorption refrigeration system comprising a circuit for circulation of absorption solution including a generator, means to heat said generator to expel vapor from solution therein, said generator comprising a plurality of elements including a pump for raising solution and a vertically extending conduit connected to receive solution raised by said pump and form a liquid column therein, said circuit including piping connected to the lower part of said conduit for conducting solution therefrom, said pump being constructed and arranged to effect circulation of solution in said circuit by utilizing the expelled vapor to lift solution therein by vapor-liquid lift action to the upper part of said conduit at a first region thereof which is above the liquid surface of the liquid column formed therein and at which first region the lifting vapor is separated from the raised solution, structure embodied in the system for varying the pressure to which the liquid surface of the column in said conduit is subjected by the vapor in the upper part of said conduit, conduit means connecting an element of said generator and said vertically extending conduit at a second region below the first region at which the raised solution is introduced therein, the column of liquid in said vertically extending conduit having its liquid surface below said second region during normal operation of said system and rising to said second region responsive to a predetermined decrease in the pressure to which the liquid column is subjected by the vapor in the upper part of said conduit, said conduit means being arranged for conducting liquid therethrough by gravity from said second region to said generator element.

7. An absorption refrigeration system as set forth in claim 6 in which said generator is so constructed and arranged that liquid conducted by gravity through said conduit means to said element is conducted therefrom to the inlet of said pump.

8. An absorption refrigeration system as set forth in claim 6 in which said circuit for circulation of absorption solution includes an absorber and an analyzer and connections for conducting solution from said absorber to said analyzer and from the latter to said generator, and means for conducting vapor from the upper part of said conduit to said analyzer, said conduit means connecting said second region of said vertically extending conduit and said element of said generator including said analyzer.

9. An absorption refrigeration system as set forth in claim 6 in which said circuit for circulation of absorption solution includes an absorber, means including said piping for conducting absorption solution from said generator to said absorber, means in said circuit for conducting absorption solution from said absorber to said pump, said conduit means connecting said second region of said vertically extending conduit and said element being constructed to conduit liquid therethrough from said second region to the inlet of said pump, said second region at which said conduit means is connected to said vertically extending conduit being at a level insufficiently high for solution to flow only by gravity through said piping to said absorber.

10. An absorption refrigeration system as set forth in claim 9 in which said conduit means connecting said second region and said generator element includes a part of said means for conducting absorption solution from said absorber to said pump.

11. An absorption refrigeration system as set forth in claim 6 which includes a condenser, conduit means including an analyzer in said absorption solution circuit for conducting vapor from the upper part of said vertically extending conduit to said condenser for condensation therein, a cooling element connected to receive condensate from said condenser, a line which by-passes said condenser for conducting vapor from the upper part of said conduit to said cooling element, said line including a U-shaped trap, said structure embodied in the system for varying the pressure to which the liquid surface of the column in said conduit is subjected by the vapor in the upper part of said conduit including means for collecting liquid in said trap and for removing liquid therefrom, the column of liquid in said vertically extending conduit having its liquid surface below said second region thereof during normal operation of said system when flow of vapor through said trap is blocked by liquid collected therein and rising to said second region responsive to flow of vapor through said trap upon removal of liquid therefrom.

12. An absorption refrigeration system as set forth in claim 11 in which said circuit for circulation of absorption solution includes an absorber, means including said piping for conducting absorption solution from said generator to said absorber, means in said circuit for conducting absorption solution from said absorber to said pump, said conduit means connecting said second region and said element being constructed to conduct liquid therethrough from said second region to the inlet of said pump, said second region at which said conduit means is connected to said vertically extending conduit being at a level insufficiently high for solution to flow only by gravity from said conduit through said piping to said absorber when the vapor pressures in said cooling element and the upper part of said vertically extending conduit are substantially equalized responsive to flow of vapor through said trap upon removal of liquid therefrom.

13. An absorption refrigeration system as set forth in claim 12 in which said conduit means connecting said region and said element is so constructed and arranged that it provides a passage for conducting vapor from the upper part of said vertically extending conduit to said analyzer.

References Cited in the file of this patent

UNITED STATES PATENTS 2,285,884    Ashby _____ June 9, 1942

UNITED STATES PATENT OFFICE
CERTIFICATE OF CORRECTION

Patent No. 2,942,431                      June 28, 1960

Wilhelm Georg Kogel

It is hereby certified that error appears in the printed specification of the above numbered patent requiring correction and that the said Letters Patent should read as corrected below.

Column 5, line 8, after "can be" insert -- rapidly --; column 12, line 1, for "conduit" read -- conduct --; line 27, for "sad" read -- said --.

Signed and sealed this 31st day of January 1961.

(SEAL)
Attest:

KARL H. AXLINE
Attesting Officer

ROBERT C. WATSON
Commissioner of Patents